United States Patent
Leggett et al.

(10) Patent No.: US 8,661,623 B2
(45) Date of Patent: Mar. 4, 2014

(54) ATTACHMENT FOR PET TRAINING DEVICE

(75) Inventors: Martin Theodore Leggett, Hubbard, OR (US); Lisa Ann Leggett, Hubbard, OR (US)

(73) Assignee: EZ Click, LLC, Hubbard, OR (US)

(*) Notice: Subject to any disclaimer, the term of this patent is extended or adjusted under 35 U.S.C. 154(b) by 116 days.

(21) Appl. No.: 13/048,702

(22) Filed: Mar. 15, 2011

(65) Prior Publication Data

US 2012/0216372 A1 Aug. 30, 2012

Related U.S. Application Data

(60) Provisional application No. 61/447,509, filed on Feb. 28, 2011.

(51) Int. Cl.
*A44B 99/00* (2010.01)

(52) U.S. Cl.
USPC .............................. 24/3.13; 24/3.11; 24/3.12

(58) Field of Classification Search
USPC ......................................... 24/3.11, 3.12, 3.13
See application file for complete search history.

(56) References Cited

U.S. PATENT DOCUMENTS

| | | | | |
|---|---|---|---|---|
| 2,307,808 A | * | 1/1943 | Segal | 24/600.6 |
| 2,539,698 A | * | 1/1951 | Pearson | 248/104 |
| 3,072,097 A | * | 1/1963 | Morchand | 119/719 |
| 3,148,428 A | * | 9/1964 | Koven | 24/616 |
| 5,150,504 A | * | 9/1992 | Cohen | 24/302 |
| 5,494,002 A | * | 2/1996 | Greene | 119/719 |
| 5,593,159 A | | 1/1997 | Otake | |
| 5,957,515 A | * | 9/1999 | Van Der Sluys | 294/25 |
| 6,776,503 B1 | * | 8/2004 | Chang | 362/201 |
| 7,028,640 B1 | | 4/2006 | Cummings | |
| 7,674,153 B2 | * | 3/2010 | King | 446/415 |
| 2008/0104802 A1 | * | 5/2008 | Vermillion | 24/3.12 |
| 2009/0007390 A1 | * | 1/2009 | Tsang et al. | 24/3.13 |

OTHER PUBLICATIONS

The Clicker Company; 'Attachments'; http://www.clickercompany.com/Attachments_c_9.html; downloaded from the Internet Jun. 14, 2011; 1 pg.
Creative Services of New England; 'Custom Imprinted Plastic Clickers & Noise Makers'; http://csne2.homestead.com/clickers.html; downloaded from the Internet Jun. 14, 2011; 1 pg.
Training Lines—Unique Dog Products; 'Clicker Training Accessories'; http://www.traininglines.co.uk/clicker-training-accessories-537-0.html; downloaded from the Internet Jun. 14, 2011; 11 pgs.

* cited by examiner

*Primary Examiner* — Robert J Sandy
*Assistant Examiner* — David Upchurch
(74) *Attorney, Agent, or Firm* — Chernoff Vilhauer McClung & Stenzel, LLP

(57) ABSTRACT

An attachment selectively attachable to a pet training device that emits signal upon actuation by the hand that grasps the pet training device. The attachment includes an aperture for selectively securing the attachment to a hand and at least one connector for securing the attachment to the pet training device.

17 Claims, 2 Drawing Sheets

ATTACHMENT FOR PET TRAINING DEVICE

CROSS-REFERENCE TO RELATED APPLICATIONS

This application claims priority to U.S. Provisional Patent Application No. 61/447,509, filed Feb. 28, 2011, and is incorporated herein by reference.

BACKGROUND OF THE INVENTION

The present disclosure is directed to an attachment to a pet training device, such as a clicker used to train a dog.

Training animals to behave as desired is an important aspect of pet ownership, and to this end many training techniques have been utilized over the years. One ubiquitous method of training a dog, for example, uses a clicking device that takes advantage of the phenomenon famously documented by Ivan Pavlov in which an animal can, over time, be conditioned to associate a pleasurable event (in Pavlov's experiment, being fed) with an auditory sound or other event, even to the extent that the animal enjoys the auditory sound itself.

In this method, the dog or other pet is repetitiously given a treat, or other reward, simultaneously with activation of a hand-held clicker after behaving in a desired manner. Eventually, the pet begins to associate the clicking sound itself as a reward, after which a pet owner may simply use the clicker to indicate to the pet approval of behavior.

A typical pet clicker is described in U.S. Pat. No. 7,674,153 and comprises a rigid housing surrounding an actuation member that, when actuated—usually by depression with the digit of a hand—emits a clicking sound. Usually, this sound is produced by the deflection of one end of a thin piece of metal relative to another end. Also, when the metal piece is affixed inside the cavity of a housing surrounding the metal piece, that sound may be amplified somewhat. A typical pet clicker may include an aperture at one end of the housing with which to attach the clicker to a key chain, wrist band, or other device to secure the clicker to a belt loop, a hand, etc.

To be effective, the pet clicker is preferably activated as quickly as possible after the pet behaves in a desired manner. One problem that arises is that the pet clicker, when dangling from a wrist or a belt loop, is not ready for activation quickly enough to be of use, as the pet may have changed its behavior while a person grasps for the clicker and positions it in an orientation in which it can be manually actuated, after which the pet would be "rewarded" for the wrong behavior. Conceivably, a pet owner, when walking a dog, for example, could always keep the pet clicker in hand and ready to click the instant it is desired, but this is often inconvenient as the owners hands may be needed for, say, throwing a ball or other matters.

What is desired, therefore, is an improved pet training apparatus that improves the speed at which a pet training device may be actuated from a position that is not grasped in a person's hand.

BRIEF DESCRIPTION OF THE SEVERAL DRAWINGS

DETAILED DESCRIPTION OF PREFERRED EMBODIMENTS

Figure 1A:
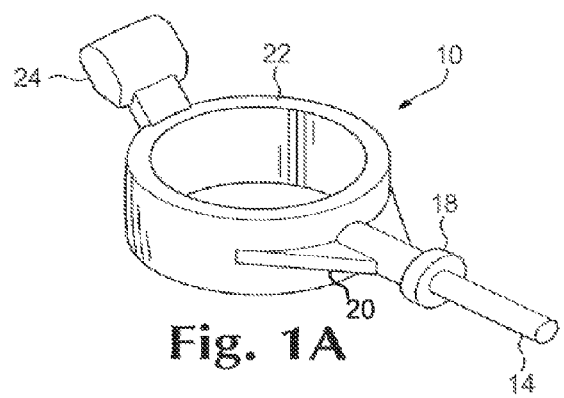
FIG. 1A shows a perspective view of a first exemplary attachment to a pet training device.
Figure 1B:
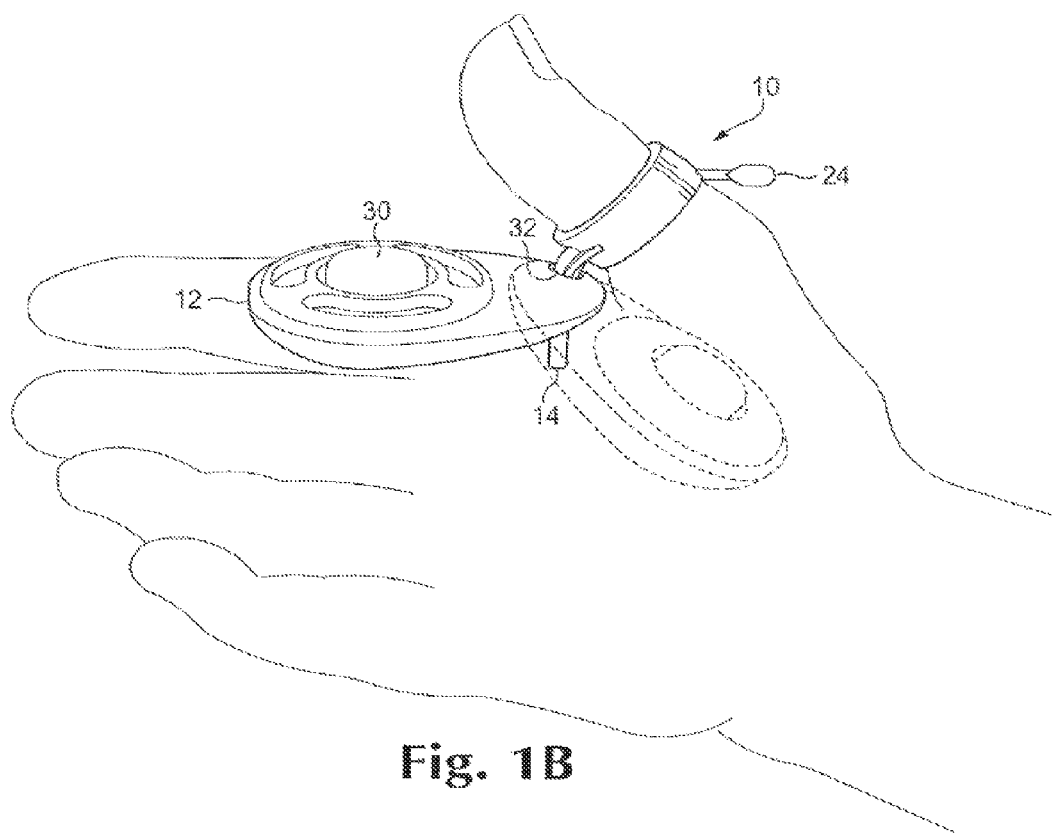
FIG. 1B shows a perspective view of the attachment shown in FIG. 1A, secured to both the digit of a person's hand and a pet training device in a first orientation, and also shows a phantom view of a second orientation, displaced form the first orientation, of the attachment of FIG. 1A and the attached pet training device.

Referring to FIGS. 1A and 1B, an exemplary attachment 10 to a pet training device, such as the device 12 (in this example a dog clicker) is shown, in which an auditory sound or other activation signal is emitted upon activation after depression of an activation surface 30 on the device 12. The attachment 10 may include a first end 14 selectively securable to the pet training device 12. For example, because most existing dog clickers include an opening 32 for securing a key chain, wristband, etc., an attachment 10 for a pet training device that is a dog clicker 12 may have a first end 14 comprising an appropriately-sized peg-portion 16 and a flexible anchor 18 having a diameter in a relaxed state that is larger than that of the opening 32, such that the peg portion 16 may be inserted through the opening 32 and then used to pull the anchor 18 that so that it squeezes through the opening 32, as well, after which the anchor 18 relaxes and secures the attachment 10 to the device 12. It should be appreciated that other means of securing an attachment 10 to a pet training device may be appropriate, depending on the pet training device. Conceivably, for example, a pet training device may be equipped with a clevis-type mount, such that a first end 14 would only need an appropriately-sized aperture to line up with those on either side of the clevis, and a securing pin used to complete the connection. It is also desirable, though not necessary, that the first end 14 be selectively detachable from the device 12 so that it can alternately be attached to other pet training devices. For example, as can be seen in the figures, the anchor 18 may be squeezed back through the opening 32 to detach the attachment 10 from the clicker 12.

The exemplary attachment 10 may also include a second end 22 for selectively attaching the attachment 10 to a digit of a person's hand, such as a thumb. In this example, the second end 22 is a flexible ring that may expand to be squeezably secured to the desired digit. Also, as with the first end 14, the second end may have other configurations, as appropriate, For example, the second end 22 may not be formed as a complete circle so long as it does not slip easily from the digit to which it is secured. Preferably, the second end 22 includes a tab 24 used to pull the attachment 10 from a person's digit after use.

As can be readily appreciated from these figures, when the disclosed attachment 10 is used to secure a pet training device 12 to the digit of a person's hand, the training device 12 does not need to be grasped in hand, yet is always ready to be grasped, and may be activated virtually instantaneously with the very act of grasping the device 12 by depressing an activation surface 30 on the device 12. To facilitate this feature, the attachment 10 may include a flexible neck 20 between the anchor 18 and the second end 22 that tapers in the direction of the first end 14. The flexible neck 20 may serve two related functions. First, the taper of the neck 20 immediately adjacent the anchor 18 secures the opening 32 to the flexible neck 20. Also, the flexibility of the neck 20 is such that the neck 20 permits the device 12 to be displaced in hand from a relaxed position as shown by the solid outline of FIG. 1B to a displaced position as shown by the phantom outline in this figure. In this case, the relaxed position refers to that to which the flexible neck region will cause the device 12 to return when displaced. In other words, the neck 20 acts to ensure that, whatever the angle or amount of deflection of the pet training device 12, due to for example, holding a ball to be thrown, the pet training device afterward returns to its relaxed position where not only will the pet training device be ready to be grasped by simply closing the hand to which it is attached, but the activation surface 30 is also ready to be activated merely upon grasping the device 12.

Another feature of the attachment 10 is that its relative orientation with the device 12 may be reversed, and it will not lose its functionality. For example, in FIG. 1B the attachment 10 is shown in a configuration where the device 12 is secured to the digit that is used to activate the device by depressing the activation surface 30. It is possible, however, to detach the device 12 from the attachment 10, turn the device 12 over and reattach it so that the activation surface is facing away from the digit to which the device 12 is attached. In that case, when grasped, the activation surface may be activated using another digit, e.g. an index finger where the device 12 is attached to the thumb. This reversal may even be accomplished while the attachment is continuously secured to the thumb (or another digit) for long training periods where one digit becomes fatigued or sore after continual use, or to avoid repetitive stress injuries by a professional dog trainer, for example.

In one preferred embodiment, the attachment 10 is approximately 2 inches in length and is advantageously integrally formed of the same flexible material. The inventors have discovered that Kraton G7720 G1 is a suitable material for the disclosed attachment, and preferably has a durometer of approximately 57. In this context, the term "approximately" means within 10%, although more preferably the durometer of the material used is within 5% of this number and even more preferably 2%. The inventors discovered that these disclosed ranges provide an appropriate balance between sufficient flexibility to securely extend over the digit of a person's hand, and the resiliency to both maintain a proper relative orientation of an attached pet training device 12 and to return a device 12 to that orientation from a deflected position. It should be understood that the dimensions suitable for the attachment 10 will vary based on factors such as the size of a person's fingers for which it is designed, the type and weight of pet training device to which it is intended to be attached, the size of any opening 32 on that device, etc.

Figure 2A:
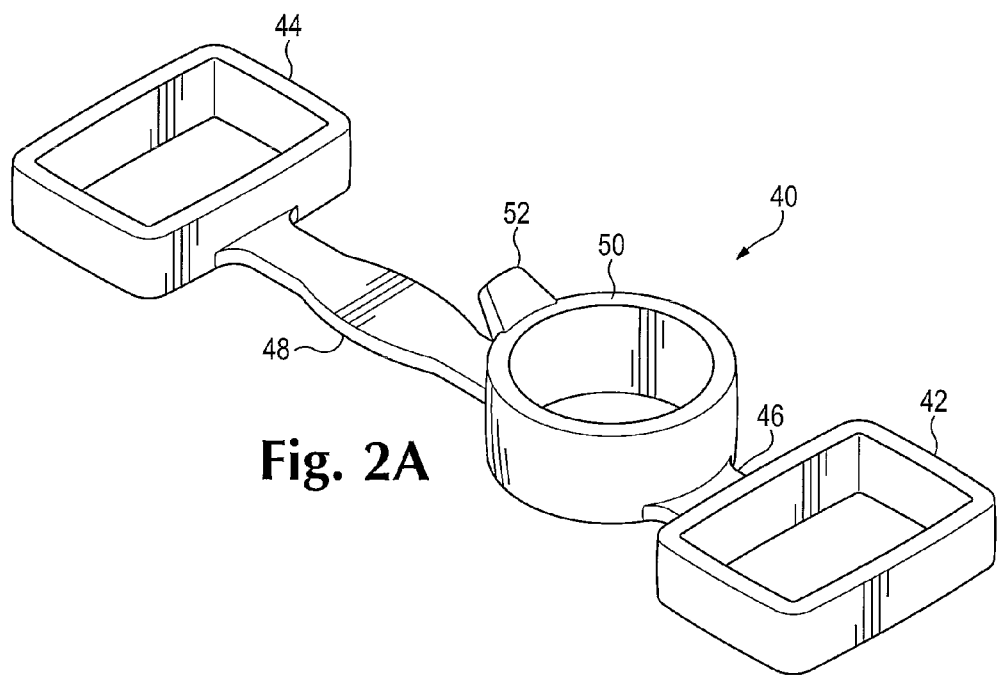
FIG. 2A shows a perspective view of a second exemplary attachment to a pet training device.
Figure 2B:
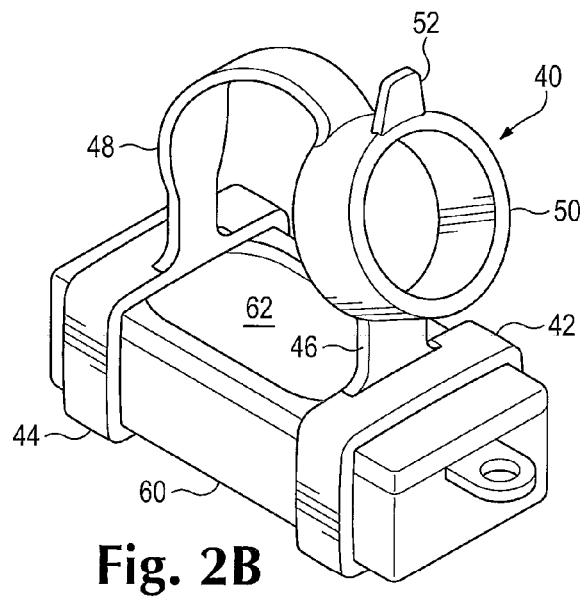
FIG. 2B shows a perspective view of the attachment shown in FIG. 2A, secured to a pet training device.

FIGS. 2A and 2B show another exemplary attachment 40. The attachment 40 preferably includes a member 50, which like the second member 22 of the attachment 10, is used to secure the attachment 40 to the digit of a person's hand. The attachment 40 preferably includes first and second flexible attachment rings 42 and 44, respectively, used to squeezably secure the attachment 40 to either end of a pet training device 60 having an activation surface 62. The member 50 also includes a tab 52 used to quickly remove the attachment 40 from a digit to which it is attached. The attachment 40 is also preferably integrally formed of the same flexible material, such as Kraton G7720 G1 with a durometer of approximately 57.

Preferably the attachment rings 42 and 44 are not spaced an equal distance to either side of the member 50. This advantageously causes the aperture of the member 50 to tilt at an angle relative to the actuation surface of the pet training device 50 to which it is attached, so that a digit inserted therein is directed downwardly towards the actuation surface. The present inventors have discovered that an appropriate angle is approximately 45-degrees, and that the attachment rings 42 and 44 be spaced apart from the member 50 by respective distances equal to or exceeding a 3:1 ratio and more preferably a 4:1 ratio through opposed flexible neck regions 46 and 48.

The attachment 40 includes the functional advantages of the device 10 as previously described. More specifically, when attached to the digit of a person's hand, such as a thumb, it may be displaced to, for example throw a ball, and yet return to a relaxed position where the device 60 is ready to be activated immediately upon being grasped by a person's hand.

The terms and expressions that have been employed in the forgoing specification are used therein as terms of description and not of limitation, and there is no intention in the use of such terms and expressions of excluding equivalence of the features shown and described or portions thereof, it being recognized that the scope of the invention is defined and limited only by the claims that follow.

What is claimed is:

1. An attachment selectively attachable to a pet training device capable of emitting a signal upon actuation of an actuator of said pet training device, using a digit of a hand selectively grasping said pet training device, said actuator having an actuation surface, said attachment comprising:
    (a) a member for selectively securing said attachment to said hand and at least one connector for selectively securing said attachment to said pet training device; and
    (b) a flexible portion allowing displacement of said actuation surface from a first position to a second position, each relative to said digit when said member secures said attachment to said hand and said at least one connector secures said attachment to said pet training device and while said hand does not grasp said pet training device, said first position allowing said pet training device to be grasped by said hand and said second position allowing an object other than said pet training device to be grasped by said hand while said hand does not grasp said pet training device, such that said attachment automatically returns said actuation surface to said first position when released from said second position.

2. The attachment of claim 1 where said attachment includes a flexible neck region between said member and said at least one connector.

3. The attachment of claim 2 where said flexible neck region resists the angular displacement of said actuation surface when said hand ceases to grasp said pet training device.

4. The attachment of claim 1 where said attachment automatically causes said actuation surface to operably face said digit when said hand grasps said pet training device from an ungrasped position, irrespective of the amount of displacement of said actuation surface, from said first position, at said ungrasped position.

5. The attachment of claim 1 including a tab for pulling attachment from said hand.

6. The attachment of claim 1 where said member and said connector are integrally formed from a flexible material.

7. An attachment selectively attachable to a pet training device capable of emitting a signal upon actuation of an actuator of said pet training device, using a digit of a hand selectively grasping said pet training device, said actuator having an actuation surface, said attachment comprising:
    (a) a member for selectively securing said attachment to said digit of said hand and at least one connector for selectively securing said attachment to said pet training device; and
    (b) a flexible neck region between said member and said at least one connector where said flexible neck region limits the displacement of said actuation surface when said hand ceases to grasp said pet training device, and where said member, said neck region, and said connector are integrally formed of an elastically flexible material.

8. The attachment of claim 7 where said actuation surface has a first position, relative to said digit, from which said actuation surface may be displaced while said hand does not grasp said pet training device, when said member secures said attachment to said hand and said at least one connector secures said attachment to said pet training device, such that said attachment acts to automatically return said actuation surface to said first position when displaced.

9. The attachment of claim 8 where said attachment automatically causes said actuation surface to operably face said first digit when said hand grasps said pet training device from an ungrasped position, irrespective of the amount of displacement of said actuation surface, from said first position, at said ungrasped position.

10. The attachment of claim 7 where said flexible neck region tapers in a direction from said member toward said at least one connector.

11. The attachment of claim 7 including a tab for detaching said attachment from said digit.

12. The attachment of claim 7 where said elastically flexible material has a durometer of approximately 57.

13. An attachment selectively attachable to a pet training device capable of emitting a signal upon actuation of an actuator of said pet training device, using a digit of a hand selectively grasping said pet training device, said attachment comprising:
(a) a member for selectively securing said attachment to said digit; and
(b) first and second connectors for selectively securing said attachment to said pet training device, said first and second connectors respectively positioned on opposed sides of said member, said first connector spaced apart from said member a distance at least three times that which said second connector is spaced apart from said member.

14. The attachment of claim 13 where said member defines an aperture and said first and second connectors are integrally formed of a flexible material and where said aperture tilts angularly when said first and second connectors are attached to said pet training device.

15. The attachment of claim 13 where said connectors each include connecting apertures for selectively, squeezably receiving said attachment.

16. The attachment of claim 13 including a tab integrally formed with said member.

17. The attachment of claim 14 where said aperture tilts at an approximate 45-degree angle when said first and second connectors are attached to said pet training device.

* * * * *